(12) United States Patent
Chun (10) Patent No.: US 6,621,905 B1
(45) Date of Patent: Sep. 16, 2003

(54) EARPHONE SUPPORT

(76) Inventor: Lam Chun, Flat F, G, H, 5/F, Block B, Marvel Ind. Bldg., 17-23 Kwai Fung Crescent, Kwai Chung, N.T. (HK)

( * ) Notice: Subject to any disclaimer, the term of this patent is extended or adjusted under 35 U.S.C. 154(b) by 0 days.

(21) Appl. No.: 09/519,738

(22) Filed: Mar. 6, 2000

(51) Int. Cl.[7] .............................................. H04M 1/00
(52) U.S. Cl. ...................... 379/430; 379/568; 379/330; 379/381
(58) Field of Search ........................ 379/430; 455/568; 381/330, 381

(56) References Cited

U.S. PATENT DOCUMENTS

| 4,020,297 | A | * | 4/1977 | Brodie | 179/156 |
|---|---|---|---|---|---|
| 4,179,590 | A | | 12/1979 | Snow | |
| 4,932,052 | A | * | 6/1990 | Lo | 379/430 |
| D311,521 | S | | 10/1990 | Jonsson et al. | |
| 5,260,997 | A | * | 11/1993 | Gattey et al. | 379/430 |
| 5,446,788 | A | * | 8/1995 | Lucey et al. | 379/430 |
| 5,450,496 | A | * | 9/1995 | Buris et al. | 381/183 |
| 6,047,076 | A | * | 4/2000 | Yang | 381/381 |
| 6,094,493 | A | * | 7/2000 | Borowsky et al. | 381/328 |
| 6,104,824 | A | * | 8/2000 | Ito | 381/381 |

* cited by examiner

*Primary Examiner*—Jack Chiang
*Assistant Examiner*—Rasha S AL-Aubaidl (57) ABSTRACT

The present invention earphone support comprises a pair of curved ear contact supports, each held substantially rigidly apart from and attached to a slideable axis, thereby forming two slideable axes that meet and form an angled set of slideable axes. The ear contact supports are thereby releasably slideable from an in-contact position with the wearer's ear to a release position therefrom. The relative dimensions of the present invention comprise are critical to the wearer's comfort.

4 Claims, 7 Drawing Sheets

EARPHONE SUPPORT

BACKGROUND OF THE INVENTION

The present invention relates to an earphone support.

It is well known in the art to provide a support for an earphone that is supported entirely on a wearer's ear.

U.S. Pat. No. 5,260,997 discloses a communication headset with two curved housings that rotate with respect to one another to allow the headset to be held firmly in place over one ear of the user. One housing supports a microphone boom which has a free end positionable adjacent to the users mouth and the other houses a receiver element for producing sound from electrical signals. Feedback between the receiver and the microphone is reduced by an elastomer friction hinge between the two housings. The receiver element is encapsulated by elastomer to further reduce feedback and to protect the receiver element from physical shock.

U.S. Pat. No. 5,881,161 discloses a headphone composed of a speaker, a microphone, and a flexible earpiece capable of being secured to the external ears of various sizes. The flexible earpiece is formed of a flexible rod which is provided at one end thereof with a female portion and at another end thereof with a male portion engageable with the female portion.

U.S. Pat. No. 4,179,590 discloses an apparatus for use with or integrally formed of a telephone instrument, where the telephone instrument is thus functional to enable concurrent use and non-use of related equipment. The apparatus has a faceset means formed of a transmitter-receiver unit worn along a user's face for positioning the transmitter in proximity to a user's mouth and the receiver in proximity to said user's ear. A module housing the electrical circuitry controls incoming and outgoing electrical signals to the telephone instrument and transfers these signals between the faceset and the telephone instrument. Hence, the user is able to employ the faceset during a telephone conversation in a hands free manner. A mechanical linkage is formed of the module and serves to actuate the on-off switch of the telephone instrument which is placed in proximity to the module and simultaneously actuating on-off switches in the module to thereby control operation of the faceset and telephone related equipment.

U.S. Pat. No. 4,020,297 discloses a light weight operator's headset that includes a generally cylindrical housing in which is disposed a receiver transducer, and an arm pivotally joined to one end of the housing. Secured to the arm is a microphone transducer, from which a sound conductive tube extends in a pivotally and extensibly adjustable fashion to the operator's mouth. An arcuate resilient member extends obliquely from the housing to define a slot therebetween in which the outer ear is received to thereby support the headset. A channel in the arcuate member receives the conductors which extend to their respective transducers.

The present inventor has evaluated the prior art devices and found that long term wearing (2+hours) of the prior art devices results in significant discomfort to most users of such earphones supported on the ear alone.

SUMMARY OF THE INVENTION

The present invention earphone support comprises a pair of curved ear contact supports, each held substantially rigidly apart from and attached to a slideable axis, thereby forming two slideable axes that meet and form an angled set of slideable axes. The ear contact supports are thereby releasably slideable from an in-contact position with the wearer's ear to a release position therefrom. The relative dimensions of the present invention comprise are critical to the wearer's comfort. The structure forming the ear contact supports are relatively thin in comparison with the prior art devices, with the substantial advantages of such thinness described below.

The present invention forms a very comfortable support device for any of several devices that may be desirably be held apart from although directed to the external acoustic meatus, such as a small speaker which may optionally comprise additional extensions for a small microphone. Such speaker/microphone combinations are well known in the art and reductions in their combined weight have not substantially alleviated the wearer's discomfort and sometimes substantial pain in long term wearing. The present invention has been found in many tests of long term wear to essentially eliminate such discomfort.

BRIEF DESCRIPTION OF THE DRAWINGS

FIGS. 18–25 show a typical wearer applying and removing the device of FIG. 12 to the wearer's ear.

FIGS. 26–28 are an alternate embodiment of the invention earphone support comprising slideable axes for opposing ear contact supports, the slideable axes having a common linear axis forming a straight edge relationship.

DETAILED DESCRIPTION OF THE INVENTION

Figure 1:
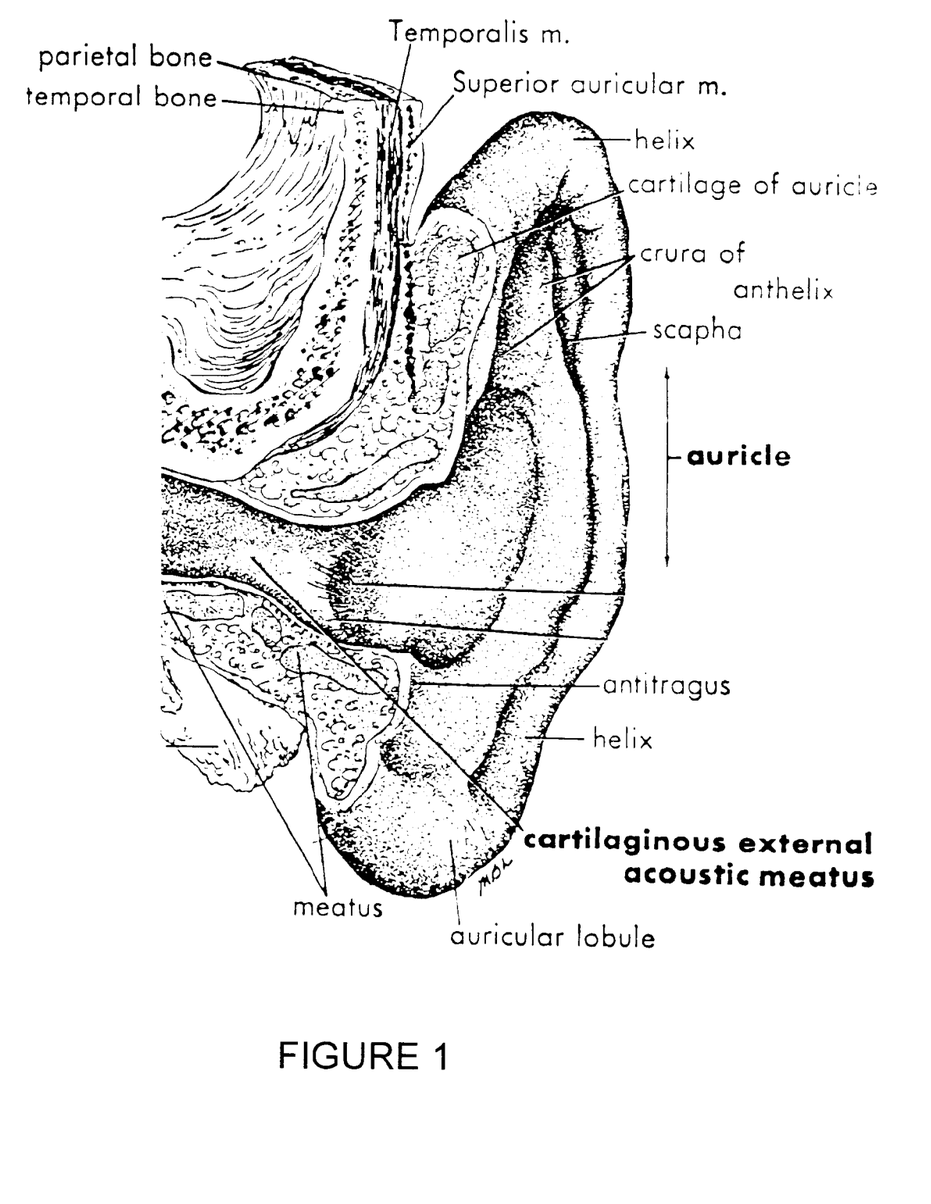
FIG. 1 is a general anatomical cross section of the human ear with appropriate medical term indications.
Figure 2:
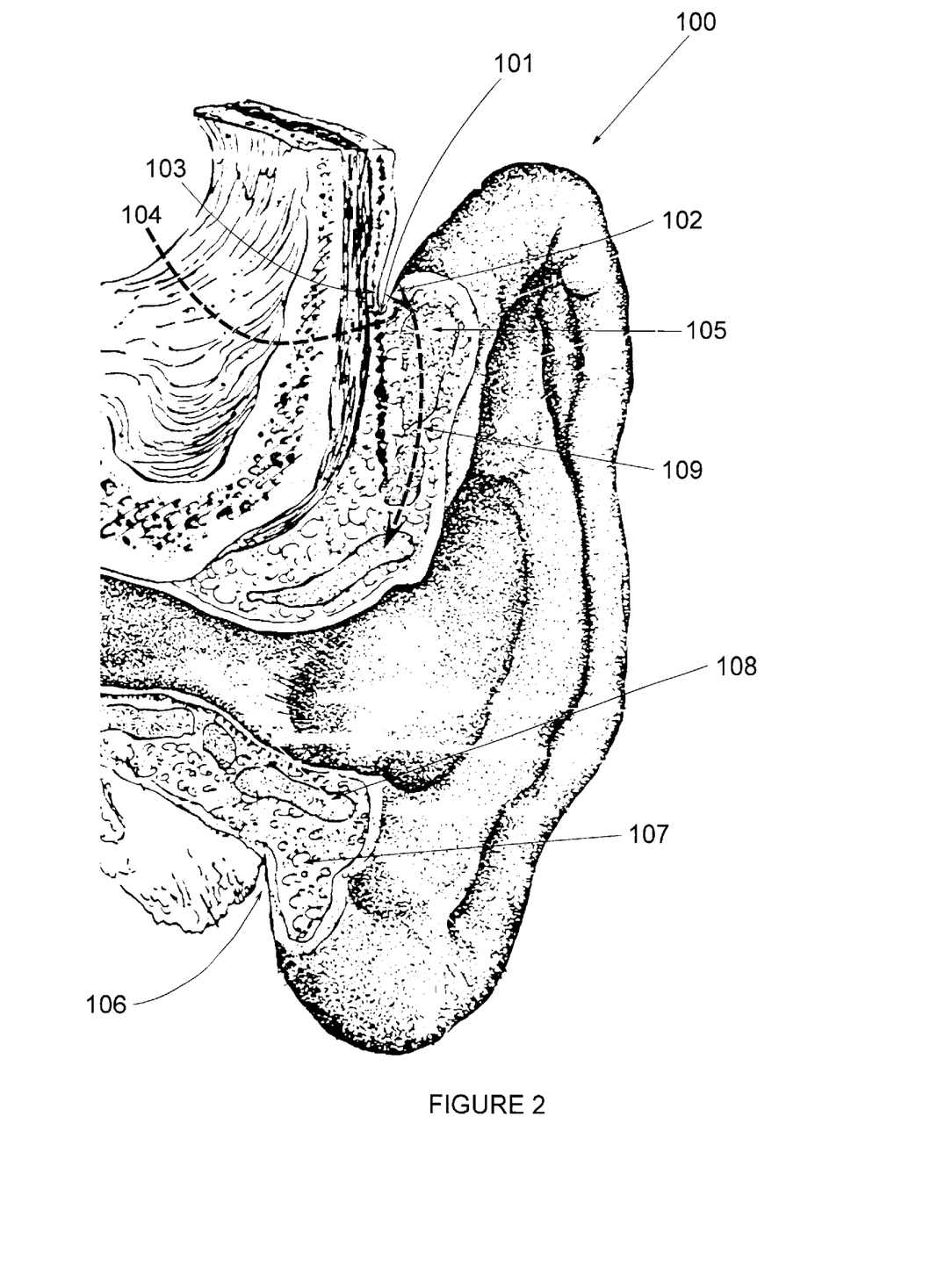
FIG. 2 is an enlarged FIG. 1 indicating critical ear anatomy related to the invention ability to provide long term wearing comfort.

FIGS. 1 and 2 show a cross section of a human ear 100 for the external and immediately internal structures. The present invention is an improvement over the prior art especially with reference to its effect on upper auricle cartilage 105. It will be appreciated the auricle lobule 107 as it extends to connect with the skin above the end of the mandible comprises mostly connective and fatty tissue and is not especially sensitive to motion or pressure. Application of a earphone support to this area alone is advantageous for that fact but without substantial help since there is relatively little rigid or tensioned skin 101, cartilage or bone against which a support might be effective. Compared to the upper ear, the lower auricle is flabby and very soft. The upper auricle, in contrast, comprises three substantially vertical slats of closely associated rigid cartilage to maintain the upright position of the auricle, as shown in FIG. 2 wherethrough passes pressure path 109.

While the upper auricle comprises cartilage useful for retention of an applied earphone support, it is a problem for the same reason. All devices for earphone support on the ear alone that permit substantial wearer motion must rest in some form in the notch 101, where the supported skin of the upper auricle attaches to the scalp. Any substantial pressure in direction 104 against the topmost slat of auricular cartilage causes a chain reaction down pressure path 109, eventually resulting in wearer discomfort and pain. The above cited references suffer from this deficiency. The portion of the prior art devices that effectively engage an upper and lower support surface about the ear compress the auricular cartilage causing discomfort. There is a significant lack of sensitivity for a properly aligned and sufficiently narrow support piece that can press essentially straight down at area 101 without causing outward motion of skin/cartilage zone 102. The scalp skin opposite area 102 is essentially without feeling for blunt objects, such that a device resting primarily against it without outward compression of the upper auricle cartilage can support substantial weight for extended periods of time. For instance, a wearer of eyeglasses may quickly appreciate a difference in frame thickness, albeit having frames are not so thin that they might form a sharp edge in the area 101 that the skin will be cut.

Figure 3:
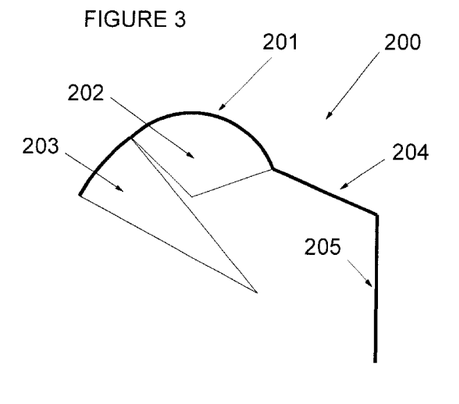
FIG. 3 is a general support line drawing of the invention ear contact support, its connection to a slideable axis and a slideable axis.
Figure 4:
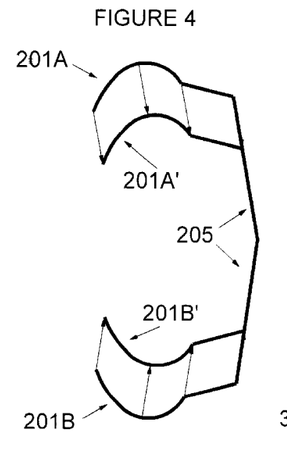
FIG. 4 shows two such line drawings in FIG. 3 connected to form the invention earphone support.
Figure 26:
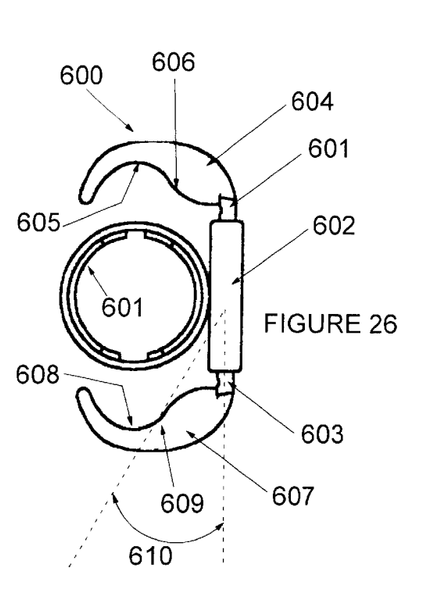
FIG. 26 shows a side view of the ear support contact pieces connected to the slidable axes, the sleeve portion supporting the earphone support ring.

FIG. 3 shows a preferred element of the present invention. Support configuration 200 comprises three main sections, ear support edge 201, connection 204 and sliding axis 205. Ear contact support edge 201 comprises a main contact section 202 comprising an arc of about 100 to 120 degrees, most preferably about 105 to 115 degrees, of a circle with a radius of about 6–9 millimeters, more preferably about 7–8 millimeters, and a rear support section 203 comprising an arc of about 5 to 25 degrees, more preferably 15 to 20 degrees, of a circle with a radius of about 10–30 millimeters, more preferably at about 15 to 20 millimeters. The section 201 connects at a leading end of section 202 to connection section 204, which in turn connects to sliding axis 205, in relation to which it is intended that edge 201 shall move in substantially rigid relationship supported therefore by connection 204. FIG. 4 shows two support configurations connected at distal ends of their axes 205 to form an angle of about 150 to 175 degrees, more preferably about 160 to 165 degrees. Support edges are movable along axes 205 from a release positions 201A and 201B to smallest ear contact positions 201A' and 201B'. It is intended broadly, in consideration of the alternate embodiments below and as shown in FIG. 26, that substantially and relationally rigid means of configuration 200 form an angle between an axis 205 and a tangent line from the proximal end of the arc of section 201 between 10 and 90 degrees, more preferably from about 150 to about 160 degrees, and the normal distance from the proximal end of section 201 to axis 205 is from about 6 to 12 millimeters, more preferably from 8 to 10 millimeters.

Figure 5:
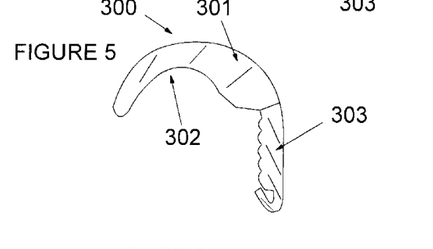
FIGS. 5 and 6 are an invention embodiment in respectively side and top views of the ear contact support, its connection to a slideable axis and a portion of a slideable axis.
Figure 6:
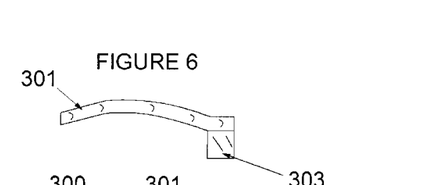
Figure 7:
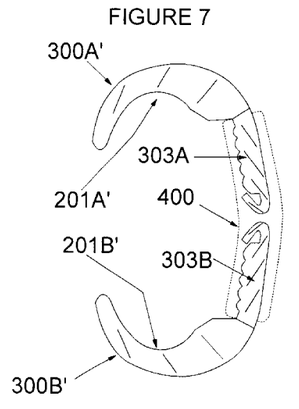
FIGS. 7 and 8 show the device of FIGS. 5 and 6 operationally connected with a slider piece, thereby respectively obtaining the relative positions shown as 201A, 201A', 201B and 201B' as in FIG. 4.
Figures 8, 9, 10:
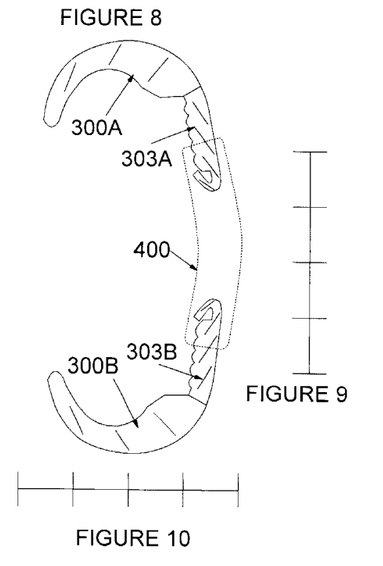
FIGS. 9 and 10 are respectively vertical and horizontal comparative measures of four centimeters as compared to the lines and devices of FIGS. 5–8.

FIGS. 9 and 10 are in proportion to the devices of FIGS. 5–8 and are rulers not representing actual lengths but instead represent a proportional 4 centimeters. FIGS. 5 and 6 show part of an embodiment of configuration 200. Piece 300 comprises support and connection section 301 having a connection section that corresponds to connection 204 integral with an edge 302 that corresponds to sections 201 and 202, and ratcheting support slider section 303 corresponding in part to axis 205. Section 303 comprises a serrated edge that is preferably mated in an engaging slider sleeve to a single or more serrations so that when the section 303 is moved inward or outward with respect to the sleeve 400, piece 300 and therefore edge 302 remain in an effectively fixed position to accomplish the objects of the invention. FIGS. 7 and 8 comprise two mirror image pieces 300 having positions 300A' and 300B', so that such pieces are slideable within sleeve 400 on their sections 303A and 303B respectively, thereby maintaining a relative pair of positions for ear contact edges 201A' and 201B' in FIG. 7. FIG. 8 shows pieces 300A and 300B and sleeve 400 in an expanded position. It has been found that an alternate embodiment of the present invention is preferred with respect to the ratcheting aspect of section 303 and its interaction with the bore of sleeve 400—the alternate embodiment comprises a smooth surface for the portion of section 303 in contact with the bore of sleeve 400 such that a simple increase in the cross section diameter of that section 303 portion will permit a pressure securement of the section 303 with respect to the sleeve 400 bore by frictional contact thereby. The amount of pressure needed is actually very slight to maintain the section 303 in an appropriate position for secure wear on a user's ear with a earphone or earphone/microphone.

Figure 11:
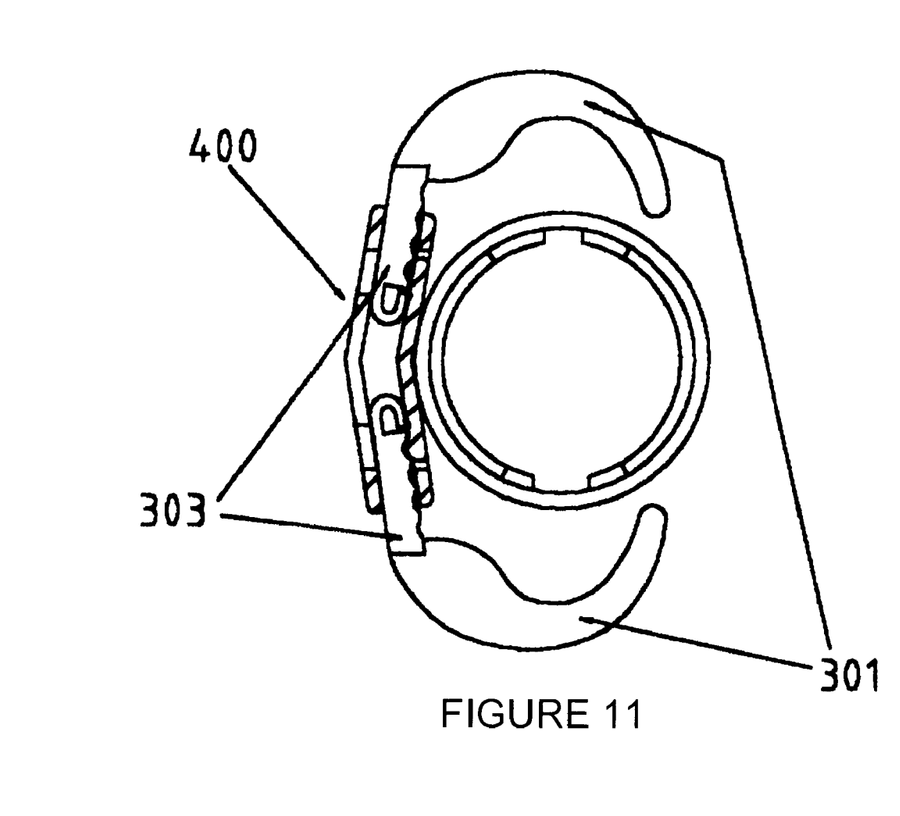
FIG. 11 is the device of FIGS. 7 and 8 having a frame attached to support an earphone or earphone/microphone, as shown in FIG. 12 next to a generalized wearer's ear in FIG. 13 and as viewed from above as applied to a wearer's ear in FIG. 14.
Figure 15:
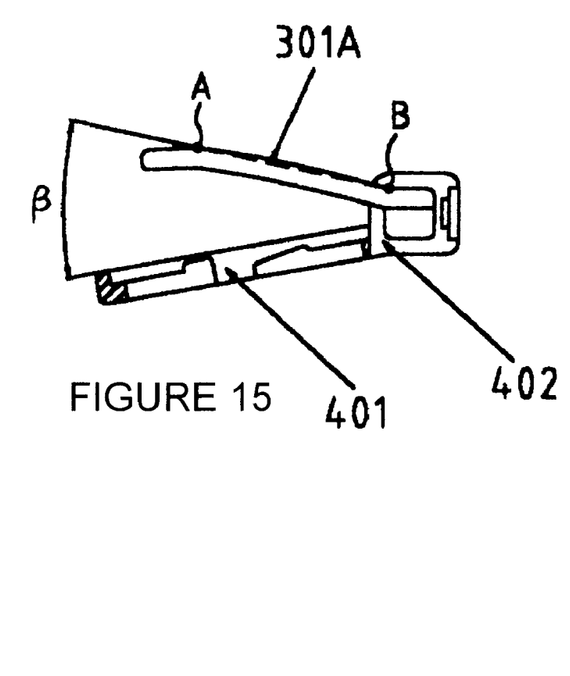
FIG. 15 is a top view of the device of FIG. 11.
Figure 16:
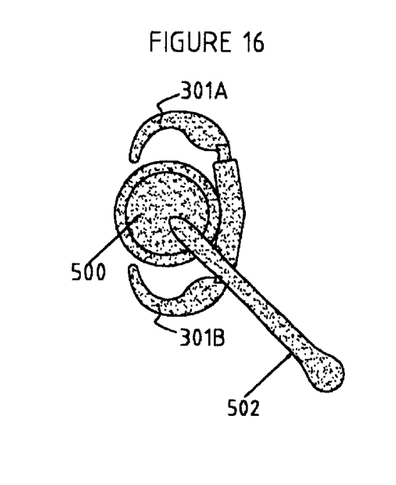
FIGS. 16 and 17 show the device of FIG. 12 as applied to the wearer's ear in FIG. 13.
Figure 17:
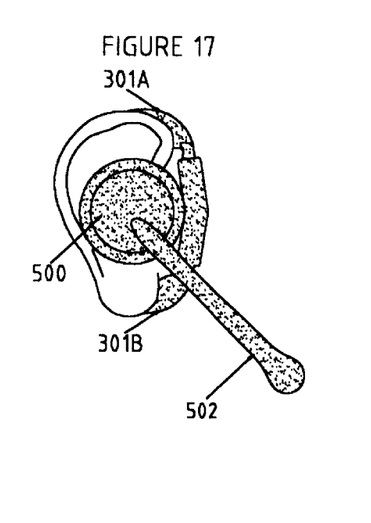
Figure 18:
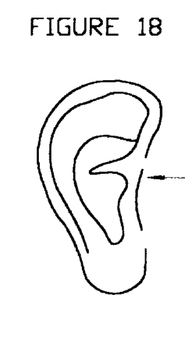
Figure 19:
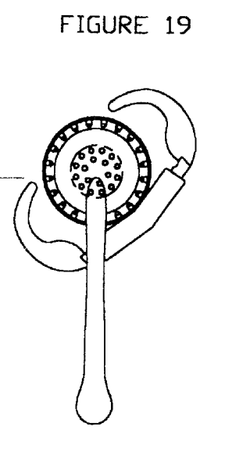
Figure 20:
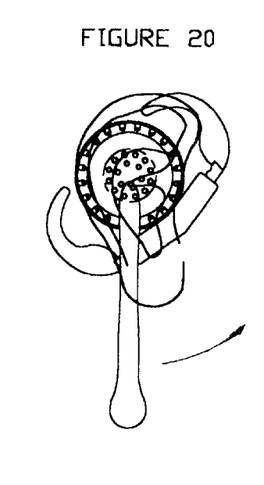

The assembly of pieces 300A and 300B and sleeve 400 comprises a base portion of the invention. The base portion is a surprisingly effective base on which to mount a support for a device situated above without substantial pressure or in most cases even touching the auricle surface lateral to the external acoustic meatus. FIGS. 11 and 15 show a base portion with a ring support 401 attached to sleeve 400 at point 402. FIGS. 11 and 15 show that the base portion in top view so that the top piece 301A obscures a bottom piece 301B, thereby showing the edge AB of a support plane formed by inside surfaces of pieces 301A and 301B, whereby such support plane will be held substantially against the wearer's scalp at the top and skin opposite the auricular lobule at the bottom. Ring support 401 is shown in one embodiment in FIG. 15 to extend from that plate and an angle beta which may be about 18 to 37 degrees, although such a support ring could also extend directly from the sleeve 400 connection normal or otherwise from that plane for a short length and then extend to a position adapted to support an earphone as described below. The angle beta as just described is the result of intense research and surveying about 1,000 wearer's of the invention device as in FIGS. 11 and 15 and the associated Figures.

Figure 12:
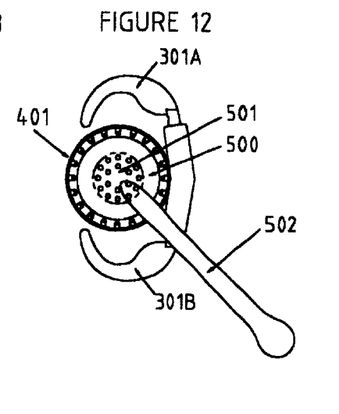
Figure 13:
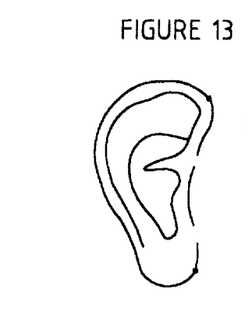
Figure 14:
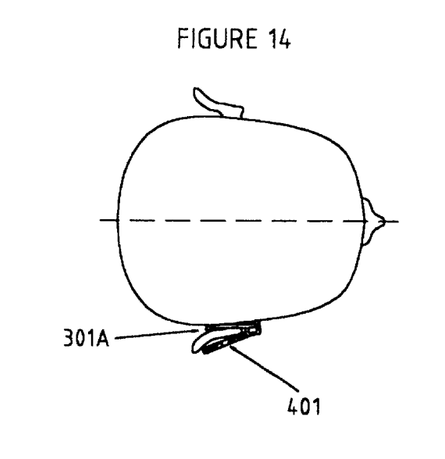
Figure 21:
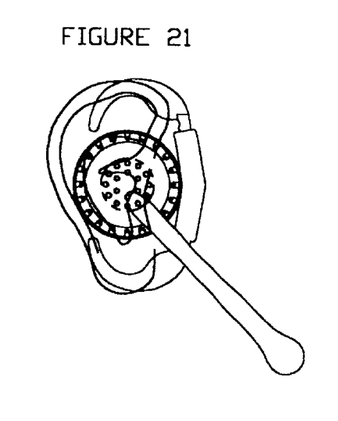
Figure 22:
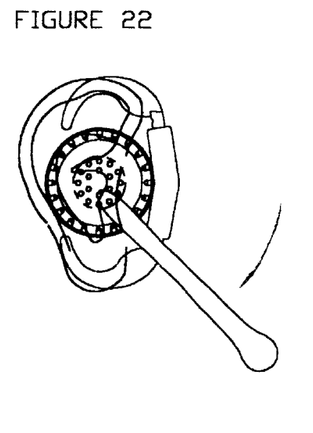
Figure 23:
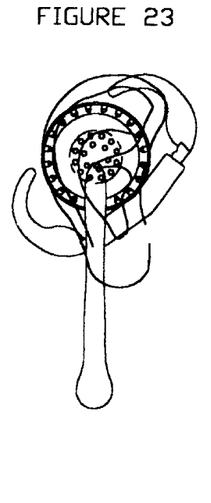
Figure 24:
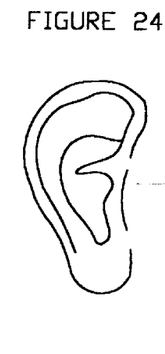

Combination device 500 in FIG. 12 comprises an earphone speaker 501 and microphone extension 502. Speaker 501 attaches by adhesive, snap fit or other such means to support ring 401 such that when the wearer as in FIGS. 14, 17 and FIGS. 18–25 apply the base portion to their right or left ear, the ear-directed surface of the speaker 501 is held away from the ear without substantial pressure thereon or without touching the ear at all. It will be appreciated that even though FIGS. 18–25 show application to and removal from a wearer's ear of the invention base portion, ring support and combination device without extension or insertion of sections 303 out of or into, respectively, sleeve 400, such movements are a more preferred method of application and removal. For example, a wearer may press an edge 201B of a piece 300B as in FIG. 8 onto the area 106 of FIG. 2 and thereafter swivel, as in FIG. 20, an edge 201A of a piece 300A as in FIG. 8 into a location just above the area 101 of FIG. 2, whereafter the user uses a thumb and forefinger to depress, respectively, an outer edge of piece 301B and an outer edge of piece 301A so that the ratcheting insertion of the sections 303B and 303A into sleeve 400 adapts the open position device of FIG. 8 into the ear-contacting position of FIG. 7, and as comfortably fitting as shown in FIG. 21.

It is critical to the comfort of the wearer that the thickness of the piece 301 be about from 1 to 2.5 millimeters as seen in the top views of FIG. 6 and 15. At less than 1 millimeter, the edge becomes too sharp for extended wear. At greater than about 2.5 millimeters, the average person's ear in area 101 of FIG. 2 is uncomfortably pressured.

Figure 27:
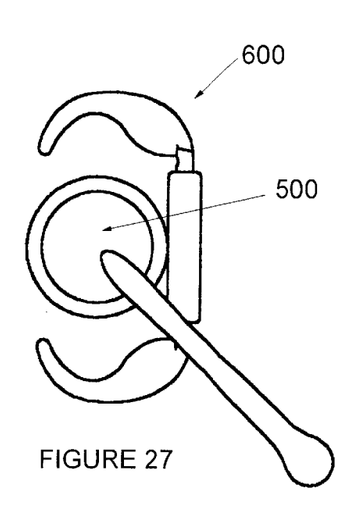
FIG. 27 shows an earphone/microphone mounted on the device of FIG. 26.
Figure 28:
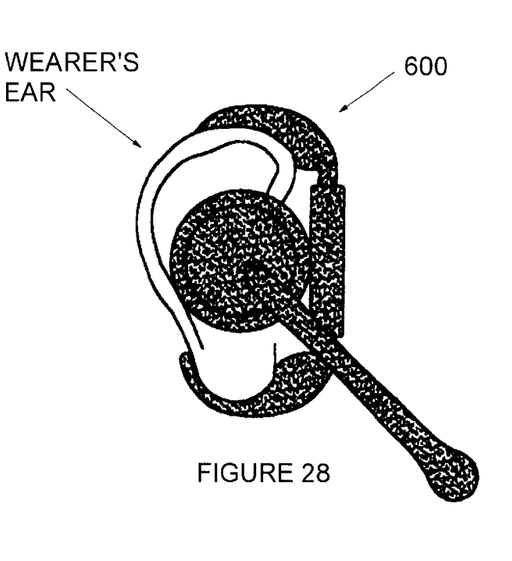
FIG. 28 shows the device of FIG. 27 worn by the user.

FIGS. 26–28 are an alternate embodiment of the invention earphone support comprising a single linear axis for the slideable axes for main contact sections 605 and 608, corresponding respectively to main contact sections 202A and 202B of ear support edges 301A and 301B. In contrast to the sleeve 400 of FIG. 7, the sleeve 602 of FIG. 26 comprises a bore adapted to accommodate the releaseable sliding of sections 602 and 603 as described in FIG. 7 for section 303 in the bore of sleeve 400, the difference being that the sleeve 602 requires that the slideable axes for the device 600 are a single line forming an angle of 180 degrees at the juncture point. Approximate locations of proximate endpoints 606 and 609 of main contact sections 605 and 608 are indicated in FIG. 26. In addition, an exemplary tangent line is extended from endpoint 609 to its associated slideable axis, whereby is formed angle 610. Angle 610 is in the invention embodiments as an example of the above described range of from 10 to 90 degrees, the selection of which is restricted at its highest angle by the design which causes the distal endpoint of section 605 of FIG. 26 or section 202A of FIG. 7 (being the sections in this description that will effectively support device 600 on an area 101 of a wearer's ear) to impress uncomfortably on such an area downward from area 101 on a wearer's ear, as would the end of the arms of eyeglasses if they were so adapted with a similar main contact section. It has been found that the rigid and slideable relationship of a narrow main contact section with a slideable axis is critical to a wearer's long term wearing comfort.

The above design disclosures present the skilled person with considerable and wide ranges from which to choose appropriate obvious modifications for the above examples. However, the objects of the present invention will still be obtained by the skilled person applying such design disclosures in an appropriate manner.

I claim:
1. An earphone support comprising:
   (a) a base portion comprising first and second opposing ear contact support edges, each of such edges located on an edge support piece, whereby each edge support piece is slideably and rigidly attached to axes means for receiving a portion of each edge support piece and for moving the support edges together or apart along one of two slideable axes, where the two axes means meet and form a sliding angle of in the axes means of from 160 to 165 degrees and where an assembly of the base portion forms a planar structure as a base portion plane;
   (b) the relationship of the edge support pieces to the axes means is adapted to permit a person to apply the base portion to the wearer's ear such that a first ear contact support edge supportively contacts the wearer only at a top most juncture of the auricle and the scalp and a second ear contact support edge supportively contacts the wearer only at a lower most juncture of the auricle lobule and the skin near the top end of the mandible; and
   (c) axes means comprise means for attachment of support structure for a relatively small speaker, whereupon is rigidly and non-moveably attached a support structure supporting a relatively small speaker, the combination of the support structure and the speaker forming an effective support plane adapted to permit mounting thereon a relatively small speaker adapted to held lightly against the wearer's ear where a support angle of from about 18 to 37 degrees is formed between the support plane and the base portion plane.

2. The earphone support of claim 1 wherein the edge support piece further comprises a thickness of its portion adapted to located between a wearer's ear and scalp or between an auricle lobule and the skin near the top end of the mandible of from about 1 to 2.5 millimeters.

3. The earphone support of claim 1 wherein each ear contact support edge comprises an arc of a circle having a radius of from about 6 to 9 millimeters and an angle of from about 100 to 120 degrees.

4. The earphone support of claim 3 wherein each ear contact support edge further comprises an arc endpoint proximal to its supporting axis whereby each such ear contact support edge is adapted to be supported from its supporting axis such that a tangent line from the proximal endpoint to the supporting axis is maintained at from about 10 to 90 degrees.

* * * * *